United States Patent
Urbon et al.

(10) Patent No.: US 7,295,721 B2
(45) Date of Patent: Nov. 13, 2007

(54) POSITIONAL CONTROL OF FLEXIBLE STORAGE PHOSPHOR MEDIA DURING IMAGE SCAN

(75) Inventors: Michael P. Urbon, Churchville, NY (US); Steven D. Daniels, Churchville, NY (US); Peter A. Newman, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 843 days.

(21) Appl. No.: 10/768,448

(22) Filed: Jan. 30, 2004

(65) Prior Publication Data

US 2004/0251437 A1 Dec. 16, 2004

Related U.S. Application Data

(60) Provisional application No. 60/444,016, filed on Jan. 31, 2003.

(51) Int. Cl.
*G06K 9/20* (2006.01)
*G06K 9/60* (2006.01)
*B65H 5/00* (2006.01)

(52) U.S. Cl. .............. 382/312; 382/305; 250/589

(58) Field of Classification Search ............. 382/305, 382/312; 250/588, 589; 378/174, 177, 184
See application file for complete search history.

(56) References Cited

U.S. PATENT DOCUMENTS

| | | | |
|---|---|---|---|
| RE31,847 E | 3/1985 | Luckey | |
| 4,883,960 A * | 11/1989 | Futamata | 250/589 |
| 5,943,390 A | 8/1999 | Wendlandt et al. | |
| 6,180,955 B1* | 1/2001 | Doggett et al. | 250/586 |
| 6,365,909 B1* | 4/2002 | Hayakawa et al. | 250/584 |
| 6,599,014 B2* | 7/2003 | Thoms | 378/184 |
| 6,773,160 B2* | 8/2004 | Evans et al. | 378/173 |

* cited by examiner

*Primary Examiner*—Kanjibhai Patel (57) ABSTRACT

A storage phosphor reader. The reader comprises a first roller pair, a cylindrical scan platen, a guide member, and a holding member. The first roller pair transport a storage phosphor medium along a path in a first direction. The cylindrical scan platen supports the medium as it is scanned by a scanner. The guide member is disposed intermediate the first roller pair and the scan platen for guiding the medium to the scan platen. The holding member is disposed downstream of the scan platen for contacting the medium after it is scanned.

18 Claims, 13 Drawing Sheets

POSITIONAL CONTROL OF FLEXIBLE STORAGE PHOSPHOR MEDIA DURING IMAGE SCAN

CROSS REFERENCE TO RELATED APPLICATIONS

This is a 111A application of Provisional Application Ser. No. 60/444,016, filed Jan. 31, 2003.

FIELD OF THE INVENTION

The invention is directed to optical imaging systems, and more particularly to a storage phosphor imaging system.

BACKGROUND OF THE INVENTION

Storage phosphor imaging systems are known. In one such system, a storage phosphor is exposed to an x-ray image of an object, such as a body part of a patient, to record a latent x-ray image in the storage phosphor. The latent x-ray image is read out by stimulating the storage phosphor with stimulating radiation. Upon stimulation, the storage phosphor releases emitted radiation of a particular wavelength. To produce a signal useful in electronic image processing, the storage phosphor is scanned, for example, by a laser beam deflected by an oscillating or rotating scanning mirror or by a rotation hologon. The emitted radiation from the storage phosphor is reflected by a collector and detected by a photodetector, such as a photomultiplier, to produce an electronic x-ray image signal. The x-ray image signal can then be viewed as a visual image produced by a softcopy display device, such as a CRT or LCD display, or a hardcopy display device, such as a x-ray film printer (laser printer, CRT printer, thermal printer). U.S. Pat. No. Re. 31,847, issued Mar. 12, 1985, inventor Luckey discloses a storage phosphor system. The reader is often referred to as a computed radiography (CR) reader.

The storage phosphor can be disposed on a medium. Such a medium can be flexible, semi-flexible, semi-rigid, or rigid, and can be configured as a sheet or other substantially planar arrangement. When the storage phosphor is being processed/scanned/read/exposed by the storage phosphor processor/reader, it is important that the position of the storage phosphor be controlled so as to not introduce any artifacts in the processed image.

Accordingly, there exists a need to control a medium as it is being transported through an optical imaging system. In Applicant's particular application, there exists a need to control a storage phosphor medium in a storage phosphor reader.

SUMMARY OF THE INVENTION

An object of the present invention is to provide a system and method to control a medium as it is transported through an optical imaging system.

Another object of the present invention is to provide such a system and method wherein the medium is configured as a sheet.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a storage phosphor reader. The reader comprises a first roller pair, a cylindrical scan platen, a guide member, and a holding member. The first roller pair transport a storage phosphor medium along a path in a first direction. The cylindrical scan platen supports the medium as it is scanned by a scanner. The guide member is disposed intermediate the first roller pair and the scan platen for guiding the medium to the scan platen. The holding member is disposed downstream of the scan platen for contacting the medium after it is scanned.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

As indicated above, storage phosphor can be disposed on a medium which can be flexible, semi-flexible, semi-rigid, or rigid (i.e., a screen), and can be configured as a sheet or other substantially planar arrangement. For ease of discussion, the present invention will be described with regard to the medium being a flexible sheet. The medium is often referred to as a screen.

Figure 1:
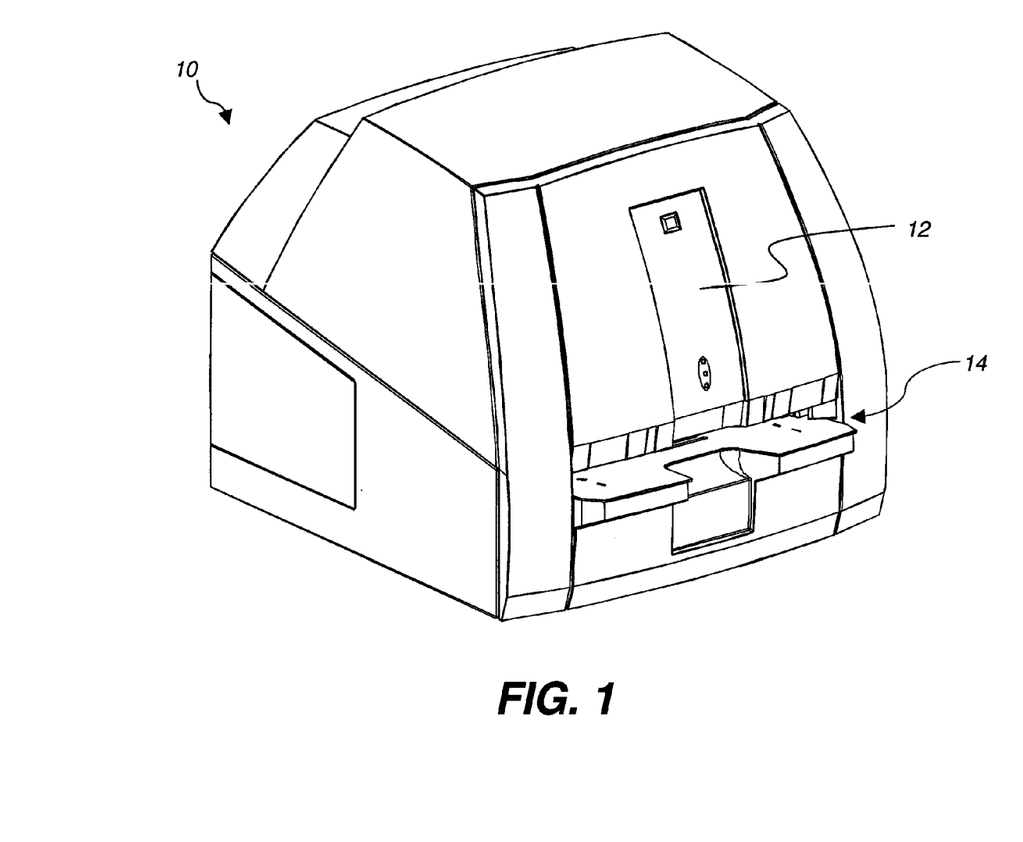
FIG. 1 shows a front perspective view of a storage phosphor reader in accordance with the present invention.
Figure 2:
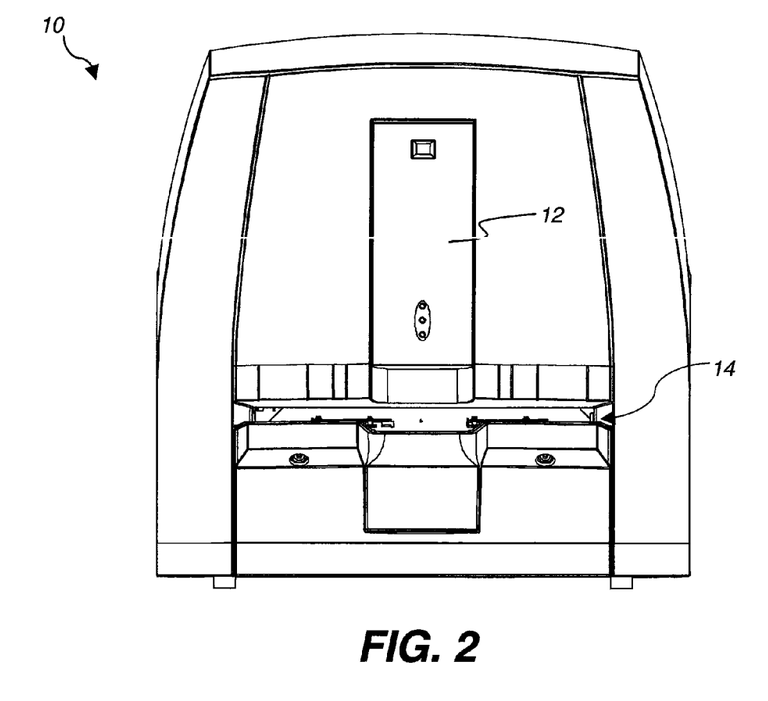
FIG. 2 shows a front view of a storage phosphor reader of FIG. 1.

Referring to FIGS. 1 and 2 there is shown an exemplary storage phosphor reader 10 in accordance with the present invention. Storage phosphor reader 10 processes images captured on storage phosphor using conventional radiographic equipments. Reader 10 then scans the storage phosphor and converts the latent x-ray image therein into an electrical x-ray image signal that can be viewed. Reader 10 can be operated using a touch screen, generally illustrated in FIG. 1 as display 12.

The screen can be mounted in an x-ray cassette. An example of such a cassette is disclosed in U.S. Pat. No. 5,943,390, issued Aug. 24, 1999, inventors Wendlandt et al. and U.S. Ser. No. 08/087,990 (Kodak Docket No. 85921) provisionally filed on Feb. 3, 2003 as Provisional Application U.S. Ser. No. 60/444,462, both being commonly assigned and incorporated herein by reference. Such cassettes can be of varying sizes.

Once the radiology technologist exposes a body part to an x-ray which is storage as a latent image on the screen, the cassette is loaded into reader 10 at a supply area or receiving station 14. Receiving station 14 is shown in FIG. 1 as a load platform. Scanning is then initiated, for example, by pressing a start button on touch screen 12.

Figure 3:
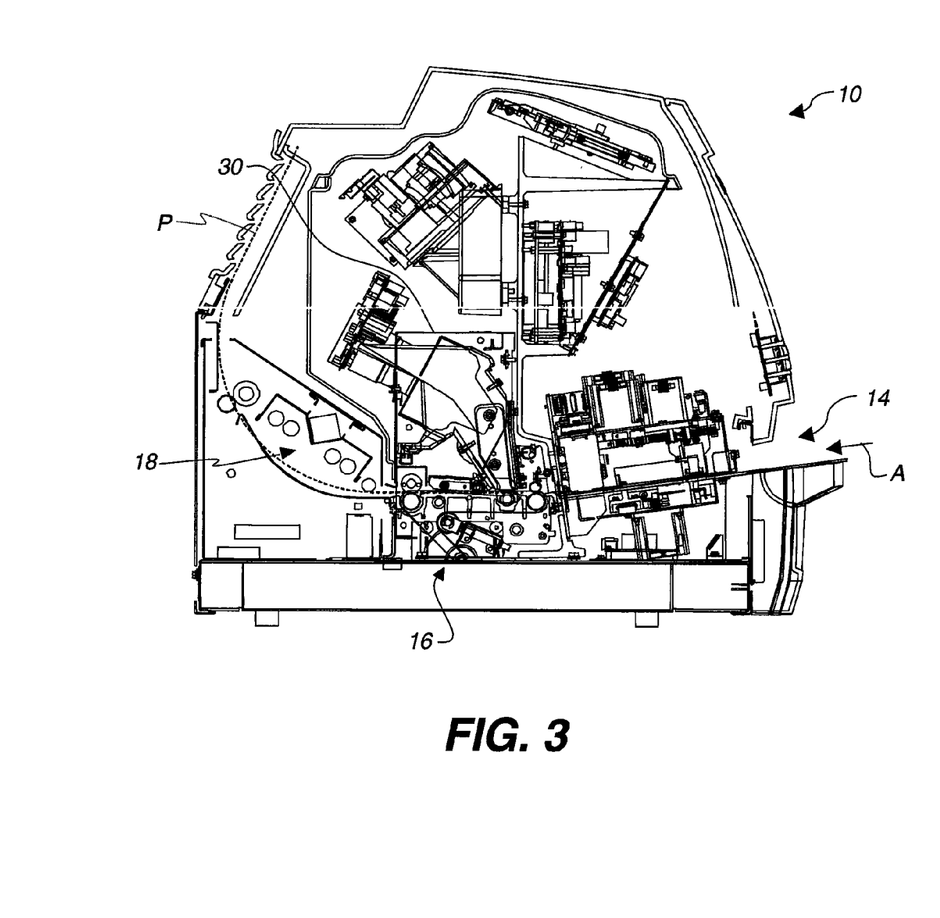
FIG. 3 shows a left side plan view of the storage phosphor reader of FIGS. 1 and 2.
Figure 4:
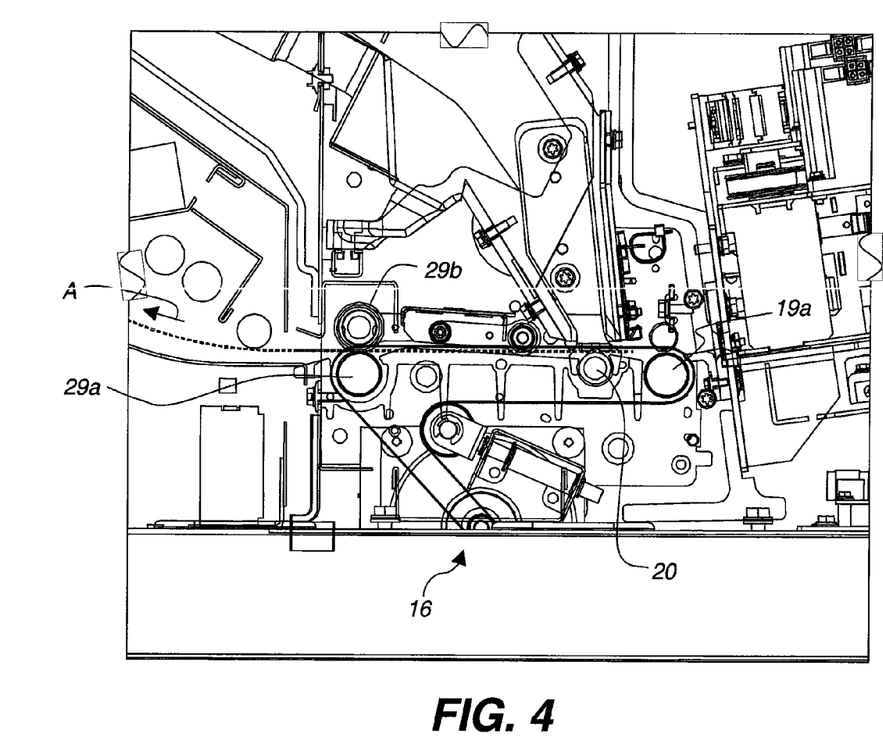
FIG. 4 shows the scan reader assembly of the storage phosphor reader of FIG. 3.
Figure 5:
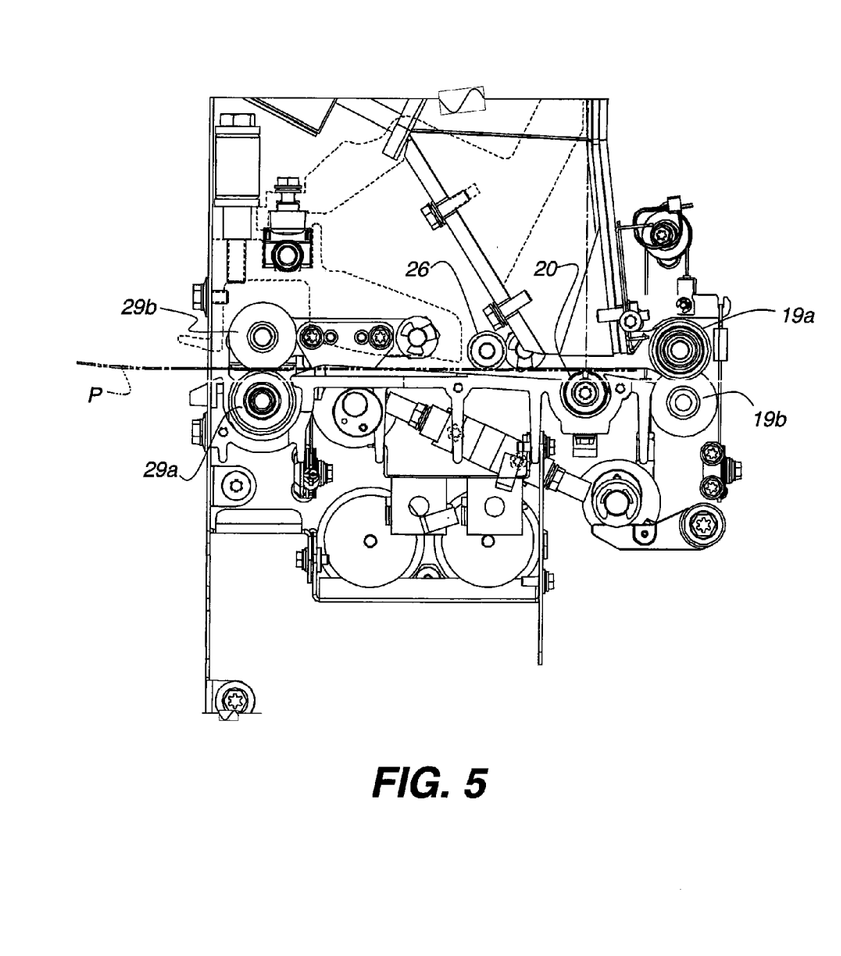
FIG. 5 shows the scan reader assembly of the storage phosphor reader of FIG. 3.

Referring now to FIG. 3, inside reader 10, using means known to those skilled in the art, the screen is extracted from the cassette and moved along a path P in a direction A through a scan reader assembly disposed in a scan area 16 wherein the screen is scanned.

The storage phosphor used to hold the latent image can be erased and used repeatably. Therefore, once a portion of the screen has been scanned, it is erased by being moved through an erase assembly disposed in an erase area 18 wherein it is erased by exposure to light which removes the remnants of the image. Once the entire screen has been scanned and erased, the direction of the screen is reversed and the screen is returned to the cassette. Alternatively, the screen can be erased as the screen is being returned to the cassette (i.e., when traveling in the direction reverse to direction A).

Referring now to FIGS. 3 through 9, as indicated above, the screen is extracted from a cassette 15 and moved along a path P in a direction A. Transport means known to those skilled in the art can be employed to transport the screen along path P. For Applicant's particular application, a first pair of rollers 19a,19b has been found suitable. Roller 19a is fixed and is driven. Roller 19b is a pressure roller. It is not fixed and is biased in a direction toward drive roller 19a. With this configuration, first roller pair 19a,19b form a nip which provides for the transport of the screen along path P.

Rollers 19a,19b move the screen along path P to scan area 16. Typically, in a computed radiography (CR) reader, the laser beam is scanned in a scanline over the surface of a storage phosphor screen, for example, by a reciprocating galvanometer mirror or polygon rotating mirror, in a fast scan direction while the screen is transported under the scanline in a slow scan direction.

Figure 6:
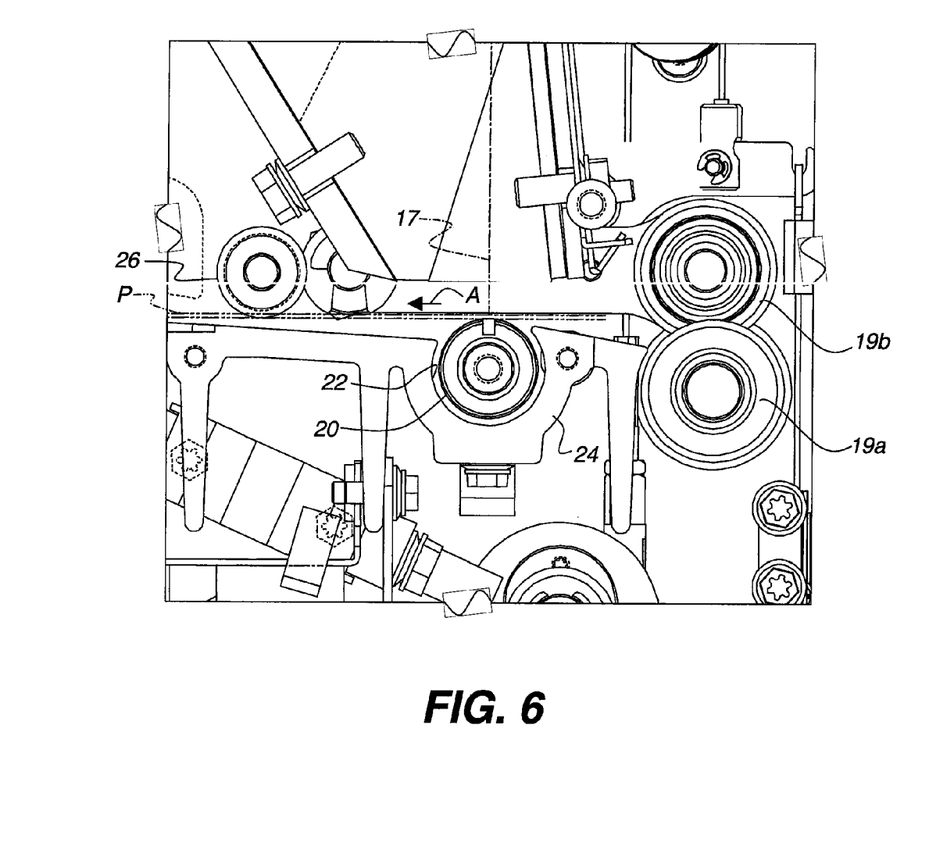
FIG. 6 shows portions of the scan reader assembly of the storage phosphor reader of FIG. 3.

Scan area 16 includes a laser scanning optical system for use in a computed radiography scanning system (or any other similar scanning system). Such a laser scanning optical system are well known to those skilled in the art, for example, as disclosed in U.S. Ser. No. 07/761,858 (Kodak Docket No. 85919) provisionally filed on Dec. 19, 2003 as U.S. Provisional No. 60/444,014, commonly assigned and incorporated herein by reference. The laser scanning optical system can includes a laser diode which produces a laser beam shaped by shaper lens elements. A reciprocating galvonometer mirror can be employed to produce a laser beam scan line 17 in a fast scan direction (noted by arrow B in FIG. 9). The scan line is directed onto a scan platen 20. Scan platen 20 establishes an imaging region for a storage phosphor transported in a slow scan direction over platen 20. As shown in FIG. 6, scan platen 20 has a cylindrical surface and is recessed in a channel 22 of guide plate 24. The surface of scan platen 20 locates the screen at the focal point F of the scanning laser beam during the reading process.

The screen is held against the surface of scan platen 20 by it stiffness as it is bent in a cantilever mode from the first roller pair 19a,19b. A roller 26, herein referred to as hold down roller 26, is disposed proximate path P to contact the screen downstream of first roller pair 19a,19b to promote contact of the screen on scan platen 20. As such, hold down roller 26 is arranged to hold down the screen, promoting a cantilever load.

A further transport means is disposed downstream of hold down roller 26 to continue the transport of the screen along path P. For Applicant's particular application, a second pair of rollers 29a,29b has been found suitable. Roller 29a is fixed and is driven. Roller 29b is a pressure roller. It can be biased in a direction toward drive roller 29a. With this configuration, second roller pair 29a,29b forms a nip which provides for continued transport of the screen along path P. Once the screen enters the nip of the second roller pair, the transport of the screen is controlled by the second roller pair.

Image artifacts might occur with the transfer of control of the transport of the screen from the first roller pair to the second roller pair. To reduce the formation of such image artifacts, in a preferred embodiment pressure roller 29b of the second roller pair is preferably initially held open (i.e., spaced from drive roller 29a) by moving pressure roller 29a away from drive roller 29b while the leading edge of the screen moves between the rollers of the second roller pair. Once the leading edge has entered the area between the rollers, pressure roller 29b is gently moved toward drive roller 29b to form a nip to transport the screen along path P. By this means, the screen is introduced into the second roller pair so as to minimize the formation of an artifact resulting from speed changes in the screen as it enters a closed roller pair.

Second roller pair 29a,29b is spaced sufficiently from hold down roller 26 and the scan beam so as to allow the screen to conform to the surface of scan platen 20 by virtue of gravity before entering second roller pair 29a,29b.

Image artifacts due to the trail edge exiting the first roller pair is minimized by positioning the first roller pair close to the scanning laser beam, thereby causing the artifact to be close to the edge of the image, in area where the image will not be read by the user. In addition to it's proximity to scan platen 20, pressure roller 19b of the first roller pair is slowly separated from drive roller 19a of the first roller pair after the second roller pair assumes drive control of the screen.

Figure 7:
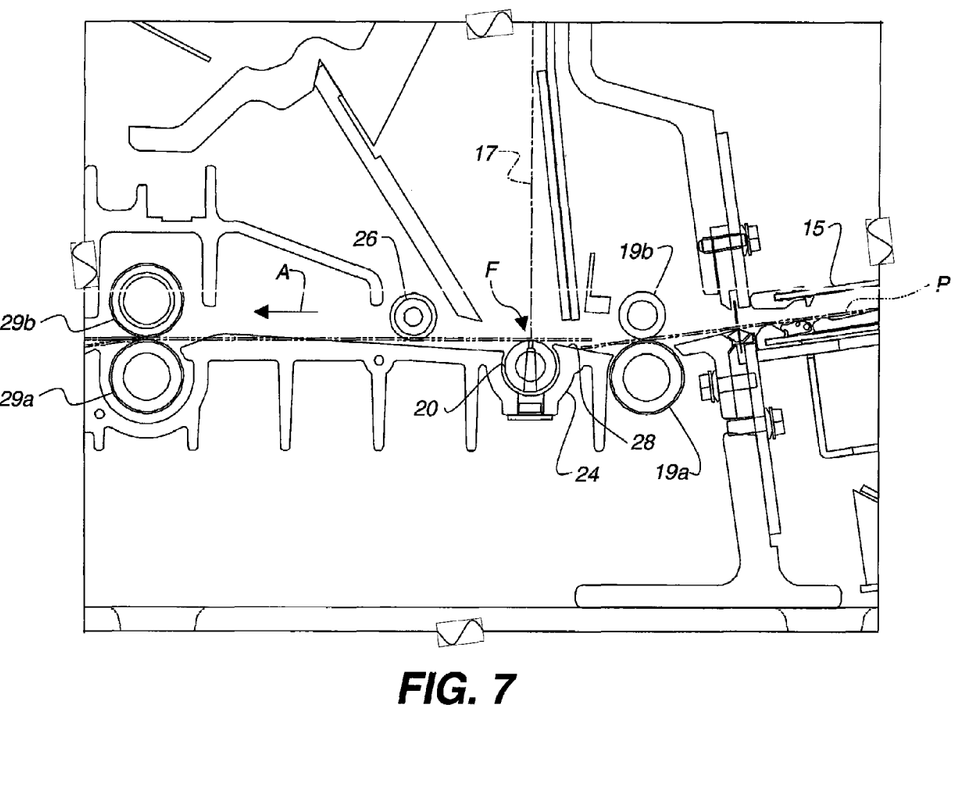
FIG. 7 shows portions of a flexible sheet medium being transported through portions of the scan reader assembly of the storage phosphor reader of FIG. 3.
Figure 8:
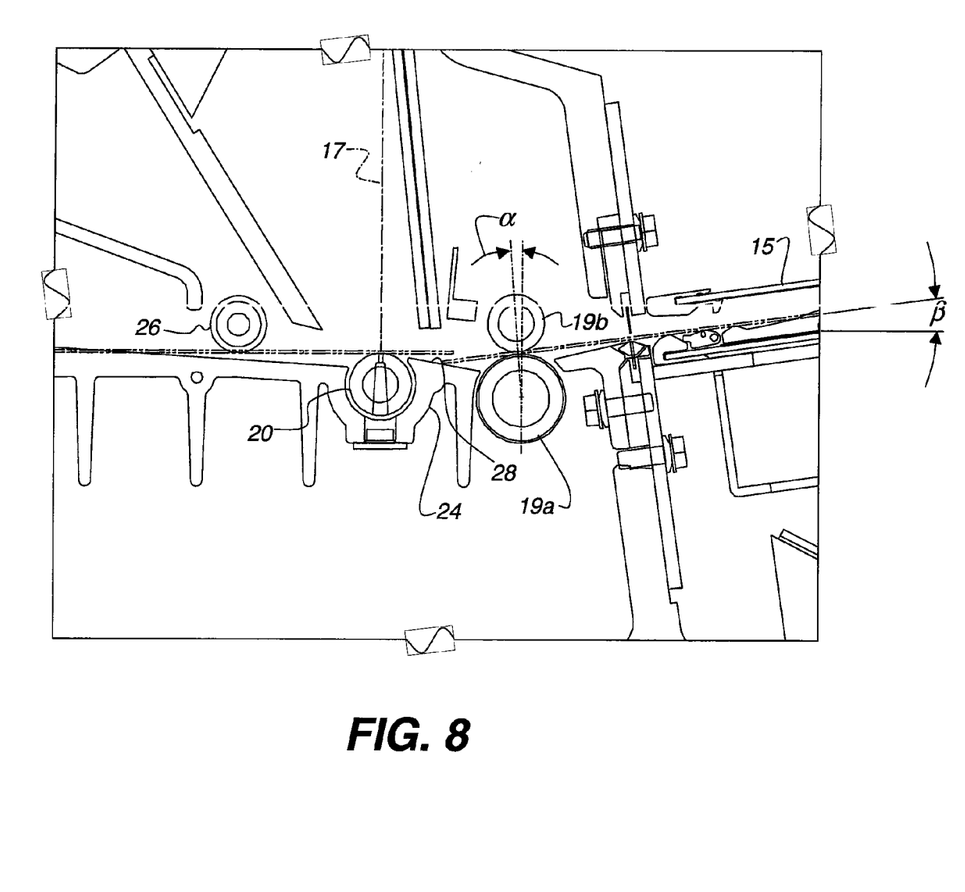
FIG. 8 shows portions of a flexible sheet medium being transported through portions of the scan reader assembly of the storage phosphor reader of FIG. 3.
Figure 9:
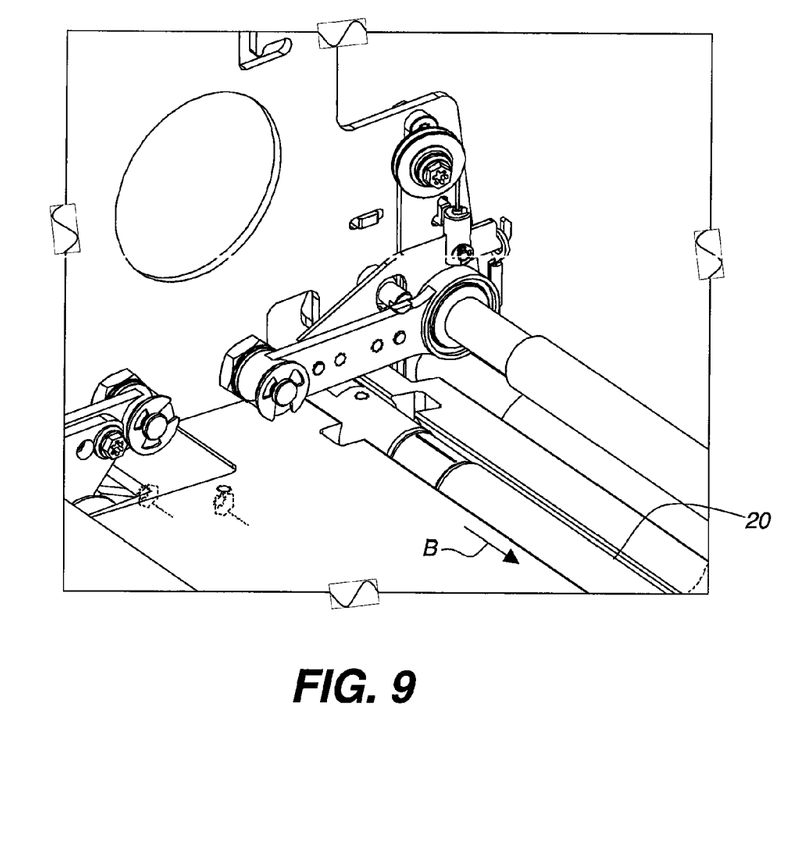
FIGS. 9-13 show perspective views elements of the storage phosphor reader of FIG. 3.
Figure 10:
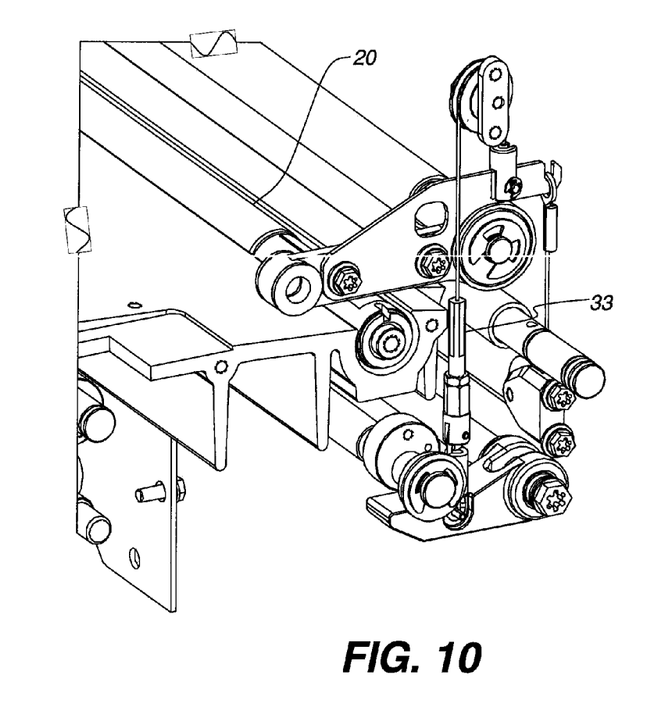
Figure 11:
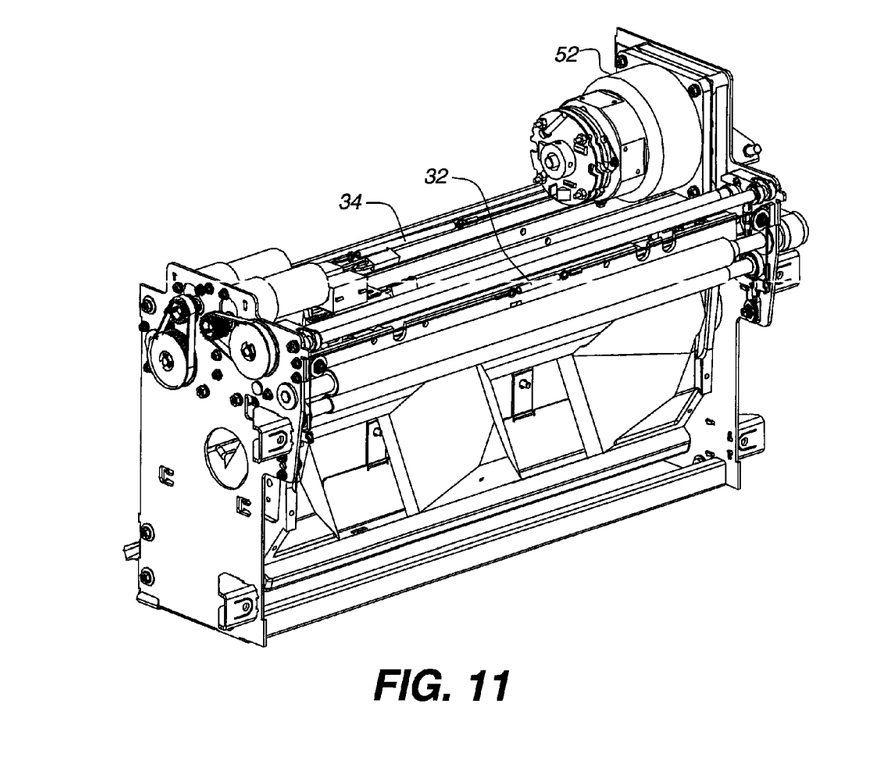
Figure 12:
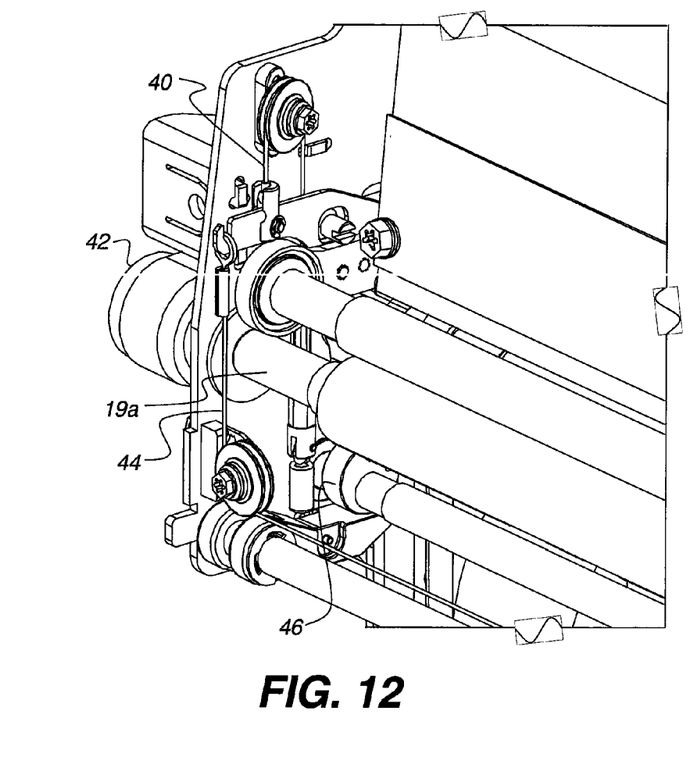
Figure 13:
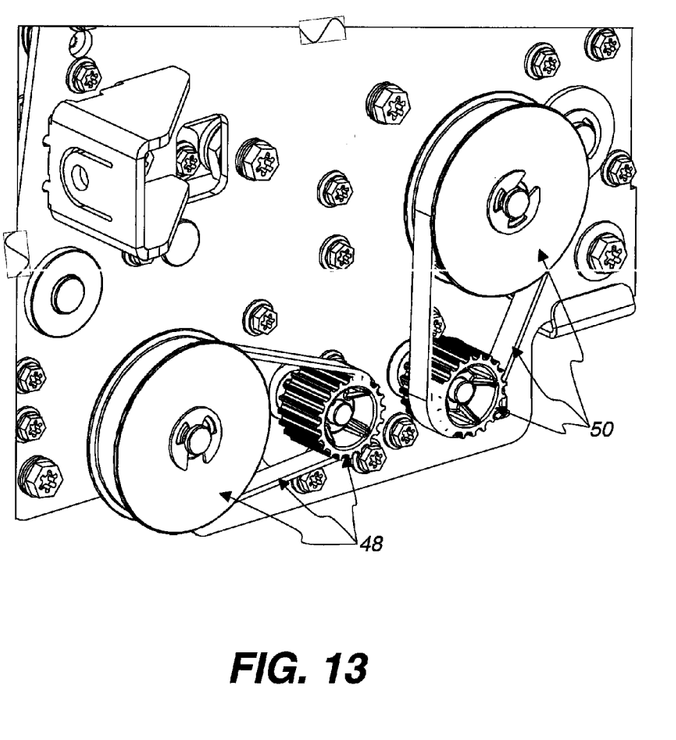

Preferably, first roller pair 19a,19b is angled by an angle α such that a leading edge of the screen encounters/contacts a screen guide 28 (disposed on guide plate 24) and is bent upward until it passes over a cylindrical locating surface of scan platen 20. This surface locates the screen at the focal point F of scanning laser beam 17 during the reading process. The screen is held against the surface of scan plate 20 by its stiffness as it is bent in a cantilever mode from the first roller pair. This is best shown in FIGS. 7 and 8 wherein the leading edge of the screen exists the nip of first roller pair 19a,19b. By introducing angle α, the leading edge is directed toward screen guide 28. As shown in FIGS. 7 and 8, screen guide 28 is an angled surface (shown here as an inclined plane) directed toward scan platen 20. The leading edge of the screen contacts screen guide 28 and appears to slide along screen guide 28 until is reaches scan platen 20. Once the leading edge of the screen contact scan plate 20, the screen loses contact with screen guide 28.

Suitable angles for angle α might range from 1 degree to 10 degrees. For Applicant's particular embodiment, an angle of 4 degrees was employed.

As shown in FIGS. 7 and 8, screen guide 28 is separate and spaced from scan platen 20. However, those skilled in the art might consider screen guide 28 and scan platen 20 as a unitary element. For example, an inclined surface abutting an arc, or alternatively, a cylinder having a relatively large radius.

To further promote the directing of the leading edge toward screen guide 28, the cassette can be angled relative to the first roller pair. For example, as shown in FIG. 8, cassette 15 might be angled at an angle β from horizontal. Suitable angles for angle β might range from 5 degrees to 10 degrees. For Applicant's particular embodiment, an angle of 8 degrees was employed.

The present invention provides for the maintaining of the positional location of the screen relative to the scanning beam focal length during the scanning process. More particularly, it is the cantilever loading of the screen against scan platen 20 that accomplishes this. The load is applied by the angle of the first roller pair relative to scan platen 20 for the early portion of the scan. During the latter portions of the scan, after the second roller pair engages the screen and the first roller pair is disengaged, hold down roller 26 provides the load for the trailing edge of the screen.

Shielding the entrance of a light collector 30 from light is important to the operation of reader 10. In addition to the a light lock cover, a unique screen path was developed to choke off any light emitted from the erase station. It is this "hump" shape, located between hold down roller 26 and the second roller pair, that accomplishes this task. The screen weaves it's way through the changing elevations. With such an arrangement, no light can make it to the collector entrance.

The first and second roller pairs might be elastomeric. Skew control can be an issue in elastomeric roller systems. Dynamic skew (continuous change) can be managed by the utilization of low density foam pressure rollers and a unique pressure delivery system. To manage skew, the forces delivered to each end of the pressure rollers is preferably closely matched. Referring to FIGS. 10-13, the present invention preferably employs a cable/pulley system (element 33 is a lift cable assembly for the first roller pair), which can be located under the assembly, and a single tension spring 32,34 (first roller pair, second roller pair, respectively) to provide equalized loads to each end of the pressure rollers. Other elements shown in these figures include a lift cable 40 for the first roller pair, a drive pulley 42 for the first roller pair, a pressure cable 44 for the first roller pair, a cam 46 for the first roller pair, cam drive components 48 for the first roller pair, cam drive components 50 for the second roller pair, and a motor 52.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 storage phosphor reader
12 touch screen display
14 receiving station
15 cassette
16 scan area
17 scanning laser beam
18 erase area
19a-19b rollers
20 scan platen
22 channel
24 guide plate
26 roller
28 screen guide
29a-29b rollers
30 light collector
32,34 single tension springs
33 lift cable assembly
40 lift cable
42 drive pulley
44 pressure cable
46 cam
48 cam drive components
50 can drive components
52 motor

What is claimed is:

1. An imaging system, comprising:
    a first transport means for transporting a storage phosphor medium along a path in a first direction; a scan platen for supporting the medium;
    a scanning means for scanning the medium as it is supported by the scan platen;
    a guide means disposed intermediate the first transport means and the scan platen for guiding the medium to the scan platen; and
    a holding member disposed downstream of the scan platen and contacting the medium to promote transport of the medium along the path.

2. The imaging system of claim 1, wherein the first transport means comprises a first roller pair forming a nip wherein one of the rollers is driven.

3. The imaging system of claim 1, further comprising a second roller pair forming a nip and disposed downstream of the holding member, one of the rollers of the second roller pair is driven to transport the medium along the path when the medium enters the nip of the second roller pair.

4. The imaging system of claim 1, wherein the first roller pair separates so as to not form a nip after the second roller pair begins transport of the medium along the path.

5. The imaging system of claim 1, wherein the guide means includes an angled surface directed toward the scan platen.

6. The imaging system of claim 1, wherein the first roller pair forms a non-perpendicular angle relative to the scan platen.

7. The imaging system of claim 6, wherein the angle from perpendicular is about 4 degrees.

8. The imaging system of claim 1, further comprising a medium receiving area for receiving the medium and directing the medium along the path, wherein the receiving area forms an angle greater than zero relative to the scan platen.

9. The imaging system of claim 8, wherein the angle is about 8 degrees.

10. The imaging system of claim 1, wherein the scan platen comprises a cylinder.

11. A storage phosphor reader, comprising:
    a first roller pair for transporting a storage phosphor medium along a path in a first direction;
    a cylindrical scan platen for supporting the medium as it is scanned by scanning means;
    a guide means disposed intermediate the first roller pair and the scan platen for guiding the medium to the scan platen; and
    a holding member disposed downstream of the scan platen for contacting the medium after it is scanned.

12. The storage phosphor reader of claim 11, further comprising a second roller pair forming a nip and disposed downstream of the holding member, the second roller pair controlling transport of the medium along the path when the medium enters a nip formed by the second roller pair.

13. The storage phosphor reader of claim 11, wherein the guide means includes an angled surface directed toward the scan platen to direct a leading edge of the medium toward the scan platen.

14. The storage phosphor reader of claim 11, wherein the first roller pair has a non-perpendicular orientation relative to the scan platen.

15. The storage phosphor reader of claim 14, wherein the angle is about 4 degrees from perpendicular.

16. The storage phosphor reader of claim 11, further comprising a receiving station for receiving a cassette having the medium disposed therein and removing the medium from the cassette for transport along the path toward the first roller pair.

17. The storage phosphor reader of claim 16, wherein the receiving station forms an angle greater than zero relative to the scan platen.

18. The storage phosphor reader of claim 17, wherein the angle is about 8 degrees.

* * * * *